United States Patent

Goto

[11] Patent Number: 6,036,397
[45] Date of Patent: *Mar. 14, 2000

[54] CONNECTOR HAVING PASSAGES FOR ADHESIVE FLOW

[75] Inventor: Yasuo Goto, Oita, Japan

[73] Assignee: Home Co., Ltd., Oita-ken, Japan

[*] Notice: This patent is subject to a terminal disclaimer.

[21] Appl. No.: 08/330,672

[22] Filed: Oct. 28, 1994

[30] Foreign Application Priority Data

Oct. 30, 1993 [JP] Japan ................................. 5-294748

[51] Int. Cl.⁷ ..................................................... F16B 13/00
[52] U.S. Cl. ........................... 403/268; 403/292; 403/404; 403/265
[58] Field of Search ........................... 52/585.1; 144/353; 156/91, 293, 303.1; 403/22, 265, 267, 268, 292, 294, 297, 298, 404; 138/140

[56] References Cited

U.S. PATENT DOCUMENTS

| | | | |
|---|---|---|---|
| 605,468 | 6/1898 | Bennett | 52/585.1 X |
| 3,048,433 | 8/1962 | Doetsch | 403/267 |
| 3,405,592 | 10/1968 | Blodee | 403/267 X |
| 3,638,978 | 2/1972 | Guntermann | 287/108 |
| 3,827,208 | 8/1974 | Elliott | 156/293 X |
| 4,063,582 | 12/1977 | Fischer | 156/293 X |
| 4,270,331 | 6/1981 | Lang et al. | 52/744 |
| 4,324,423 | 4/1982 | Pitesky | 285/156 |
| 4,516,608 | 5/1985 | Titus et al. | 138/140 |
| 4,712,957 | 12/1987 | Edwards et al. | 411/82 |
| 5,033,904 | 7/1991 | Challis | 403/264 X |
| 5,383,740 | 1/1995 | Lancelot, III | 403/268 X |
| 5,456,959 | 10/1995 | Dawes | 138/140 X |
| 5,466,086 | 11/1995 | Goto | 403/405.1 X |
| 5,468,524 | 11/1995 | Albrigo et al. | 403/265 X |
| 5,807,014 | 9/1998 | Goto | 403/268 |

FOREIGN PATENT DOCUMENTS 2034857 6/1980 United Kingdom ................. 52/726.1

*Primary Examiner*—Terry Lee Melius
*Assistant Examiner*—Andrea Chop
*Attorney, Agent, or Firm*—Lane, Aitken & McCann

[57] ABSTRACT

A connector, a connector unit, and a connected connector unit made by connecting together the connector units; all capable of providing versatility in size and strength, facilitating low cost jig fabrication and well-suited for mass production, by using a tubular member of a multiple layer structure made by laminating two or more different materials selected from the group consisting of metal, plastic, ceramic, wood or the like. The device comprises; a hollow tubular member 2 of a multiple layer structure made by laminating two or more materials, and open on at least one end thereof, an adhesive injection portion formed to make connection between the end or side and the hollow part 7 of the tubular member 2; an engage part 9 for a branch pipe formed in the adhesive injection portion; and a hollow branch pipe 10 with its one end provided with an engage part 12 capable of attaching or detaching from the engage part 9 for the branch pipe.

13 Claims, 14 Drawing Sheets

FIG. 2-a
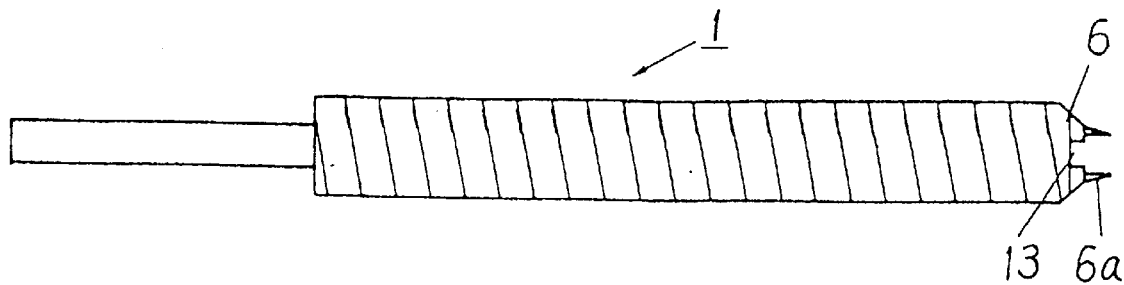
FIG. 2-b
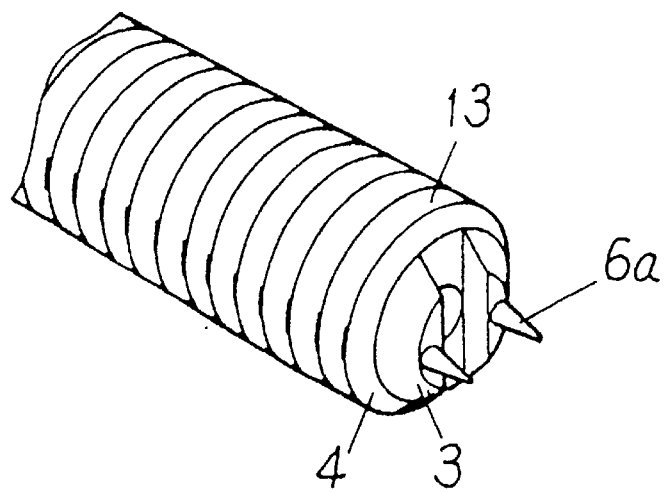

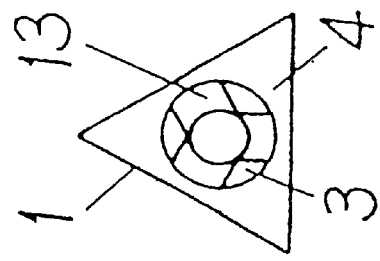
FIG. 3-e
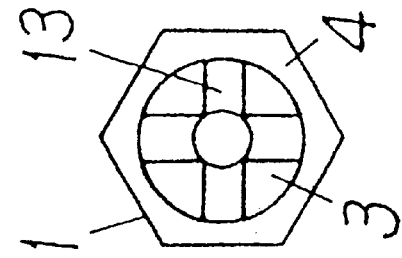
FIG. 3-d
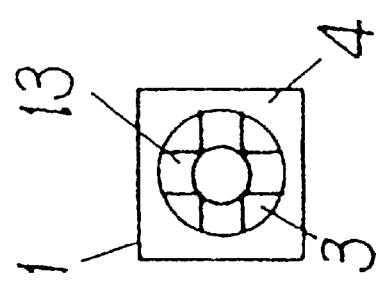
FIG. 3-c
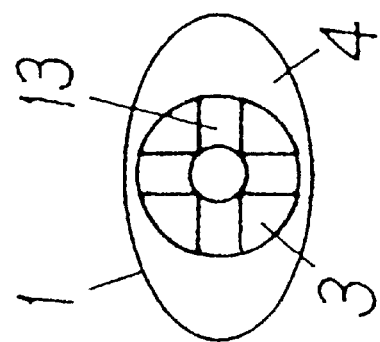
FIG. 3-b
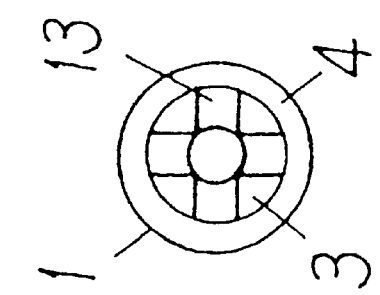
FIG. 3-a

FIG. 5-a
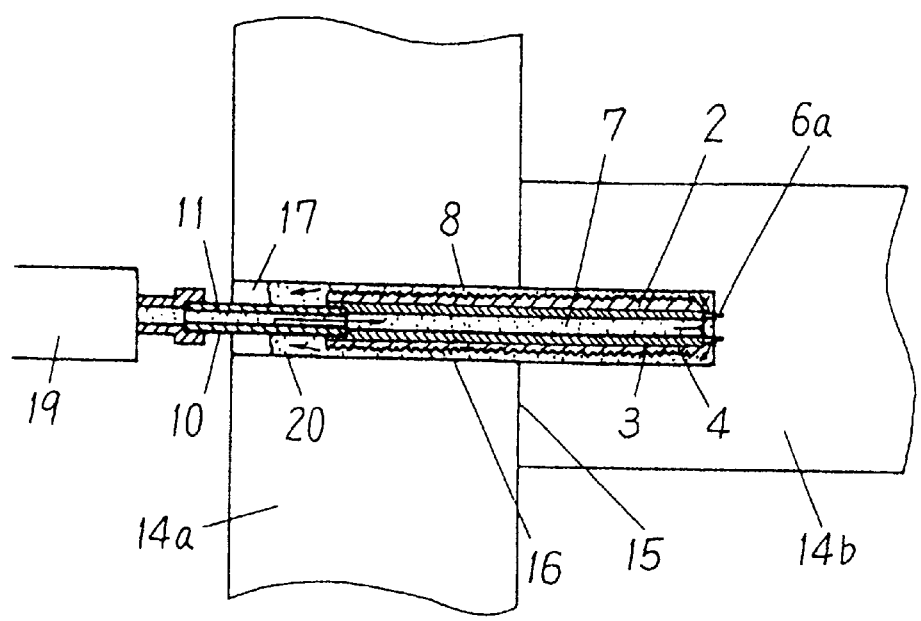
FIG. 5-b
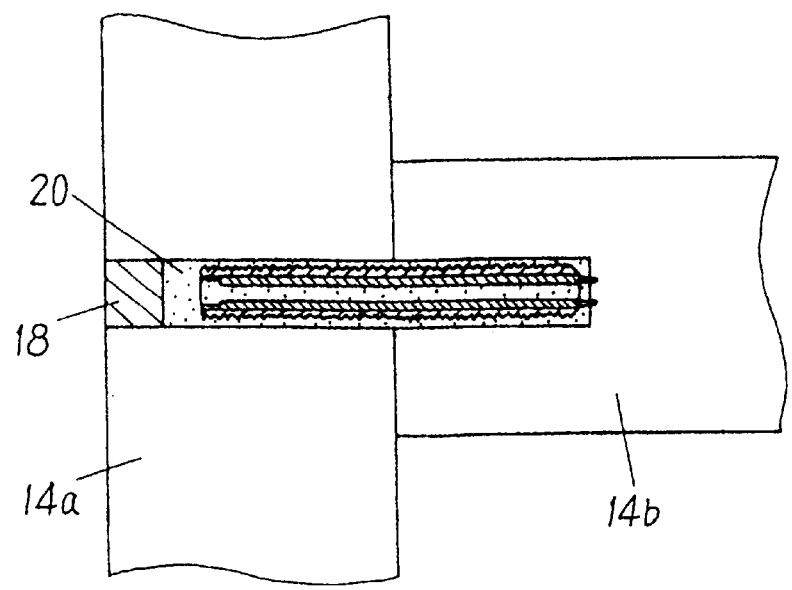

FIG. 15-a
(a)
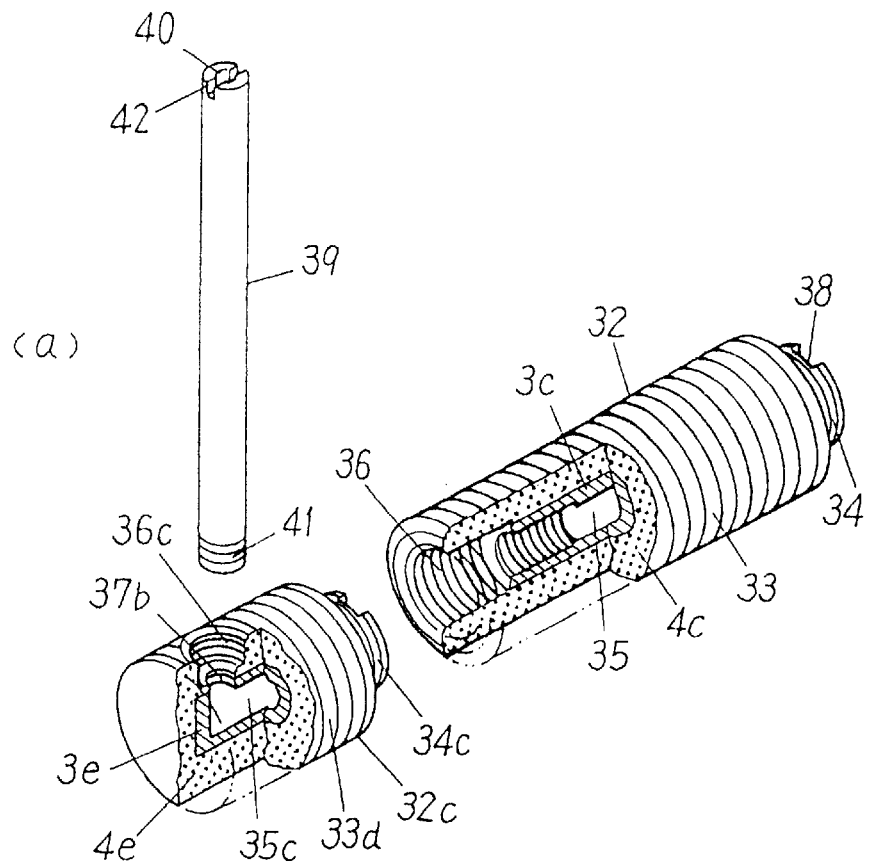
FIG. 15-b
(b)
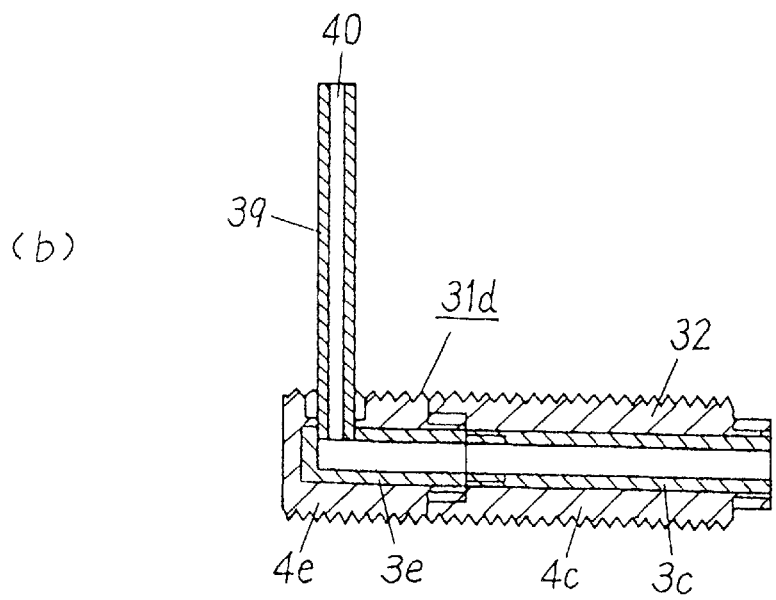

CONNECTOR HAVING PASSAGES FOR ADHESIVE FLOW

BACKGROUND OF THE INVENTION

1. Field of the Invention

This invention relates to a connector for joining members of a same material of wood, laminated wood or stone, or for joining a member of wood or laminated wood with a member of stone or concrete, and more specifically relates to a connector used in furniture or wooden dwellings or for joining structural members with joints and couplings in constructions having frames in large stud partition constructions using heavy timbers.

2. Description of the Related Art

In recent years, connectors for joining beams and pole plates, pole plates and columns, girt and independent columns for reducing labor time in the construction of houses have been developed along with joints and couplings for streamlining the work process.

For instance, Japanese U.M. Laid-open No. Sho 63-162008 shows framing fixtures used for stud partition frame working methods, Japanese U.M. Laid-open No. Hei 2-93401 shows reinforcement fixtures for joints at the bottom ends of columns and the foundations in frame type stud partitions Japanese Patent Laid-open No. Hei 3-295946 shows protruding dowel fixtures and stud frame partitions in lower wall structures using the dowel fixtures, Japanese Patent Laid-open No. Hei 2-300442 shows connecting structures for wood type structure materials with a stud frame partition that is not dismantled after connection. These inventions all use metal fixtures, or nuts or bolts to connect the structural materials.

Additionally as joint structures, Japanese Patent Laid-open Nos. Sho 63-14939, 63-14940 and 63-14941 show joints providing improved structural strength in stud frame partitions.

However these conventional connectors and joints all require a large number of metal bolts, nuts and washers, making installation difficult during the work process. Another drawback is these metal parts are difficult to carry on the job because of their large size and weight and further represent a safety hazard in work done at locations high above ground.

Besides the extra work needed to correct mistakes in installation of fixtures, there is the drawback that installations embedded at specific positions drilled for placing of cylinders and plugs, and the threading of bolts in holes in the embedded cylinders and plugs is very troublesome work requiring a large amount of man-hours and delaying building construction schedules.

Wood pieces joined by items like bolts or nuts have the drawback of loss of mechanical strength since the wood material is prone to loose its tightness and become loose when the wood material contracts over the years. Further, along with the drop in durability occurring when the metal parts of fixtures oxidized from exposure to moisture, mechanical strength and durability also decreases from corrosion occurring in metal parts such as bolts and nuts in imported materials due to exposure of the packed lumber to salt during ocean transport.

Another problem is the melting of exterior connecting bolts and metal fixtures during fires, lowering mechanical strength and the danger resulting from the house walls collapsing during fires. The greatest defect inherent in frameworks of wood material is the weakness of the connecting portion. A variety of joints and couplings are available from old carpentry methods to maintain physical strength but these contrivances are all complicated and their machining requires more man-hours thus worsening productivity. Yet another problem is that large timber pieces are difficult to mass produce and troublesome to procure, also since the maximum span of wood or laminated wood arches or trusses is limited by road traffic regulations, these pieces could not be transported.

In view of the above, the inventor of this invention, in an earnest attempt to resolve the above-mentioned problems made a patent application in Japanese Patent Application No. Hei 4-164402 proposing a connector with a simple joint and coupling doing away with conventional complicated joints and couplings, and used with an adhesive agent to improve structural strength and simplify the joint, coupling or connection job operation while drastically reducing the required man-hours, along with a connecting method for a structural member excelling in productivity and reducing man-hours by simplification of the processing technology for the joint, coupling or connection that utilized the above proposed connector, and having the further advantage of a connection for a structural member providing high fire resistance and superior structural strength.

However while this invention is superior to conventional fixtures and installation methods in fire resistance, productivity, ease of installation and workability, a drawback still exists in that the connector is made of a single layer of metal or plastic, so that for instance when the connecting surface of the structural material is narrow, the specified strength cannot be obtained if a connector with small diameter is used.

On the other hand, even when the diameter of the connecting surface is large and great strength is not required, a connector heavier than needed is used causing disadvantages in efficiency and job workability.

SUMMARY OF THE INVENTION

It is therefore an object of the invention to eliminate problems present in the conventional technology and provide a connector, connector unit and a connected connector made by connecting together the connector units, having a light-weight, connector versatile in terms of size and strength, made of inexpensive materials, easy to mass produce at a low price by utilizing a tubular member of multiple layer construction composed of layers of two or more materials from the group consisting of metal, plastic, ceramics or woods, etc.

In order to achieve the aforesaid object, the present invention is comprised of the following components.

The connector of the present invention has a multiple layer construction composed of layers of two or more materials with a hollow tubular member open on at least one end and, an adhesive agent inlet formed to connect with the hollow part from the end or the side of the tubular member.

The connector further has a branch pipe engage part formed in said adhesive agent inlet and, a hollow branch pipe formed at one end of an engage part that slidably attaches and detaches with said branch pipe engage part.

The connector further has an elongated raised part and concave or convex part on the surface of said tubular member.

The connector has a branch pipe which is fixed within said branch pipe engage part.

The connector has a tubular member which is made of a material selected from a group consisting of metal, plastic, ceramics, wood or the like.

The connector unit has a multiple layer construction composed of layers of two or more materials with a hollow tubular member open on at least one end and, a corrugated engage part connecting to slidably attach or detach with another connector unit formed to connect from at least one end of the hollow part or, from a specified part in the longitudinal direction of the tubular member to the above hollow part.

The connector unit has a branch pipe engage part formed in a step or cone shape coaxially in said unit engage part, and a hollow branch pipe formed with an engage part at one end to slidably attach and detach with said hollow branch engaging part.

The connector has a tubular member formed from material selected from the group consisting of metal, plastic, ceramics, wood or the like.

The connected connector has a plurality of mating units being connected to the engage part.

The tubular member of the connector is of multiple layer construction having a polygonal cross section such as a circle, ellipses, or triangle, rectangle, or hexagon. The outer laminated layer around the outer circumference of the core member is made up of one layer or more of laminated material composed of metallic material made from iron, steel, aluminum or alloys, or hardened plastic or carbon fibers, boron fibers, glass fibers in compounds mixed with plastic or ceramic using cement or composites, or wood materials with a hollow section formed to run longitudinally in the cross sectional center with an opening formed on at least one end.

The core and outer layer members may be made of tubular members fit to each other. The tubular member is of multiple layer construction with two or more layers of different materials. Jigs of various strengths can be obtained without changing the diameter, by changing the thicknesses of the layer. Thus jigs of various sizes and strengths can be provided.

The raised and corrugated sections are preferably formed randomly on the surface of the outer layer in continuous ridges or noncontinuous protrusions or spiral shapes in order to function as a buffer against the outflow of adhesive agent from the other end of the tubular member and also provide an anchor. The corrugated shape widens the adhesive area filled between the outer surface of the tubular member and peripheral walls of the passage holes of the tubular member. One or a plurality of raised portions may be made, or not made at the end of the tubular member or branch pipe to handle reverse flow of adhesive agent as needed according to the installation location or type (viscosity) of adhesive agent. The groove width and depth of the spirally corrugated portions can be also changed as needed, according to the viscosity of the adhesive agent.

Forming one end of the tubular member side surface in an expanded, flat, or concave shape according to the application and type of structural material will prove highly effective. For instance an expanded shape made by compressing sawdust may be used between wood or laminated wood materials. A concave shape between concrete or stone material will break down projections in the holes in the convex surfaces during insertion. Use of a flat surface will prove ideal for holes in mirror finished portions.

When guide sections such as grooves to guide the adhesive agent injected in the end of the tubular member to the outer surface are formed, the adhesive agent can pass smoothly between the surface of the tubular member and the passage holes in the peripheral walls, thus improving adhesive agent injection operation.

When a pointed protrusion is formed on the adhesive agent outflow side of the tubular member, penetrating the connector in the connecting hole and thrusting this protrusion into the bottom of the connecting hole prevents the tubular member from rotating. In particular, when the engage part of the branch pipe is released and the branch pipe extracted from the opening, connector rotation and extraction of the tubular member together with the branch pipe is prevented thus improving reliability and workability.

The branch pipe is preferably made from plastic or thin metal, so that a specific length can be cut at the work site. The engage parts of the tubular member and branch pipe can be formed with threaded holes for screwable attachment or formed with press-fit sections to mutually engage.

The adhesive agent can be injected smoothly into the connector as needed at the work site, by use of the branch pipe. Once adhesive agent is injected, the engagement with the tubular member may be released to extract the branch pipe and its length then trimmed and a plug inserted, or the branch pipe may be left in place provided there is no damage.

Giving the hollow section of the branch pipe a mirror finish is preferable in order to lessen flow resistance when the adhesive agent is injected. However the mirror finish is not necessary if the adhesive agent has low viscosity. The adhesive agent can be selected as needed according to the combination of the two structural materials; such as wood and wood, laminated wood and laminated wood, wood and laminated wood, wood, laminated wood and stone, concrete structures or stone and concrete structures. Specific examples of adhesives are organic adhesives such as epoxy and polyurethane types; and inorganic types such as mortar. Injection in two stages and pressurized injection is recommended when injecting adhesive into wood or laminated wood or concrete structures, etc. Pressurization and two stage injection prevent a drop in adhesive strength since the amount of adhesive becomes insufficient due to absorption by wood and laminated wood and concrete types.

Rectangular pillars of wood or laminated wood, or laminated layers of wood, materials of stone such as stone pillars or concrete pillars, beams and walls can be utilized as structural members.

The connecting holes formed to connect between the structural materials are drilled from one or a plurality of locations on the adjoining surface of the multiple structural materials to match the shape of the connector, with the diameter of the hole formed to the same size or slightly larger than the maximum diameter of the connector of the tubular member and the depth should preferably be formed to the same or slightly larger length than that of the connector to be held. These measures are intended to improve the workability of the hole drilling and lessen the amount of adhesive agent required. The hole for the connector can be drilled at the work site or can be precut beforehand at the factory. The hole for the connector can be formed at one or multiple locations in vertical, diagonal, oblique or positions on the adjoining surfaces as required at the work site. An application of adhesive to the periphery of the connector hole in the adjoining surfaces will prove helpful in further augmenting the structural strength.

When injection of the adhesive agent in the connecting hole is complete, a plug or buried plug can be embedded flush with the surface, or the hole repaired with putty, and then ground down for a smooth appearance.

By means of this arrangement, a multiple layer structure composed of two or more different types of materials selected from the group consisting of metal, plastic, ceramic types or wood can be easily joined in a light weight connection as required by needs for various connector sizes and strengths. In addition, transport to high locations is easily done and job workability and safety are improved.

Since a connector having the strength required for connecting the structural materials can be affixed in place, the stress is remarkably improved with respect to bending, tensile, compression and shearing forces.

Connectors of complex shapes can be easily made at the work site by merely connecting together various connector units with freely detachable connections according to the size, shape and arrangement of the structural member to be joined. Besides increased mechanical strength is provided by a connecting hole filled with a connector and adhesive agent on the outer circumference to withstand bending strain, oxidation of the connector due to exposure to moisture and brittleness from salt damage are prevented since the connector is covered with adhesive agent. Further, since the connection method is simple and the connection is strong and durable, repair of existing building structures can be performed easily.

The job process is extremely simplified and the manhours of work can be reduced since the job only involves forming a connecting hole and cut section in the adjoining surfaces of each structural member, fixably inserting the connector and injecting the adhesive agent.

Material damage and loss from installation errors is prevented since use of numerous complex metal parts is no longer necessary.

Further, by embedding the connector in the wood material, weakening of the adhesive agent due to ultraviolet exposure is prevented. During fires, the outer layer of the wood material carbonizes to prevent the connector from melting which serves to enhance safety, since the building will not collapse because structural strength is maintained.

This invention therefore provides versatility in connectors with connector units of an identical diameter providing differing strengths or with connectors of an identical strength providing differing diameters by means of connector and connector units with tubular member material of metal or plastic in a multiple layer structure. Therefore, the installation job is easily performed at the work site by using connected connectors composed of connectors and connector units having the optimal size and strength required according to the size, material and shape of the member to be connected.

The tubular member is a multiple layer structure of metal or plastic and therefore of lighter weight than single layer metal so that transport to high locations is easily done and workability is superior.

Since the core member and outer layer material can be separately manufactured in metal molds, the connector, connector unit and connected connector are easy to mass produce at low prices.

BRIEF DESCRIPTION OF THE DRAWINGS

FIG. 2-*a* is a side view of the connector for the first embodiment of this invention.

FIG. 2-*b* is perspective view of an essential part of the adhesive agent outflow end side of the connector for the first embodiment of this invention.

FIGS. 3-*a* to 3-*e* is a front view of an essential part of the end side showing a practical example of the cross sectional shapes of the tubular member of the connector of the first embodiment of this invention.

FIG. 5-*a* is a cross sectional view of an essential part of the center of the connecting hole showing the setup during installation of the joint using the connector of the first embodiment of this invention.

FIG. 5-*b* is cross sectional view of an essential part of the center of the connecting hole showing the setup during installation of the joint using the connector of the first embodiment of this invention.

FIG. 15-*a* is a partial cutaway perspective view prior to connecting the connector units together in the sixth embodiment of this invention.

FIG. 15-*b* is a cross sectional view showing the connector connected from the connector units of the sixth embodiment of this invention.

DESCRIPTION OF THE PREFERRED EMBODIMENTS

Figure 1:
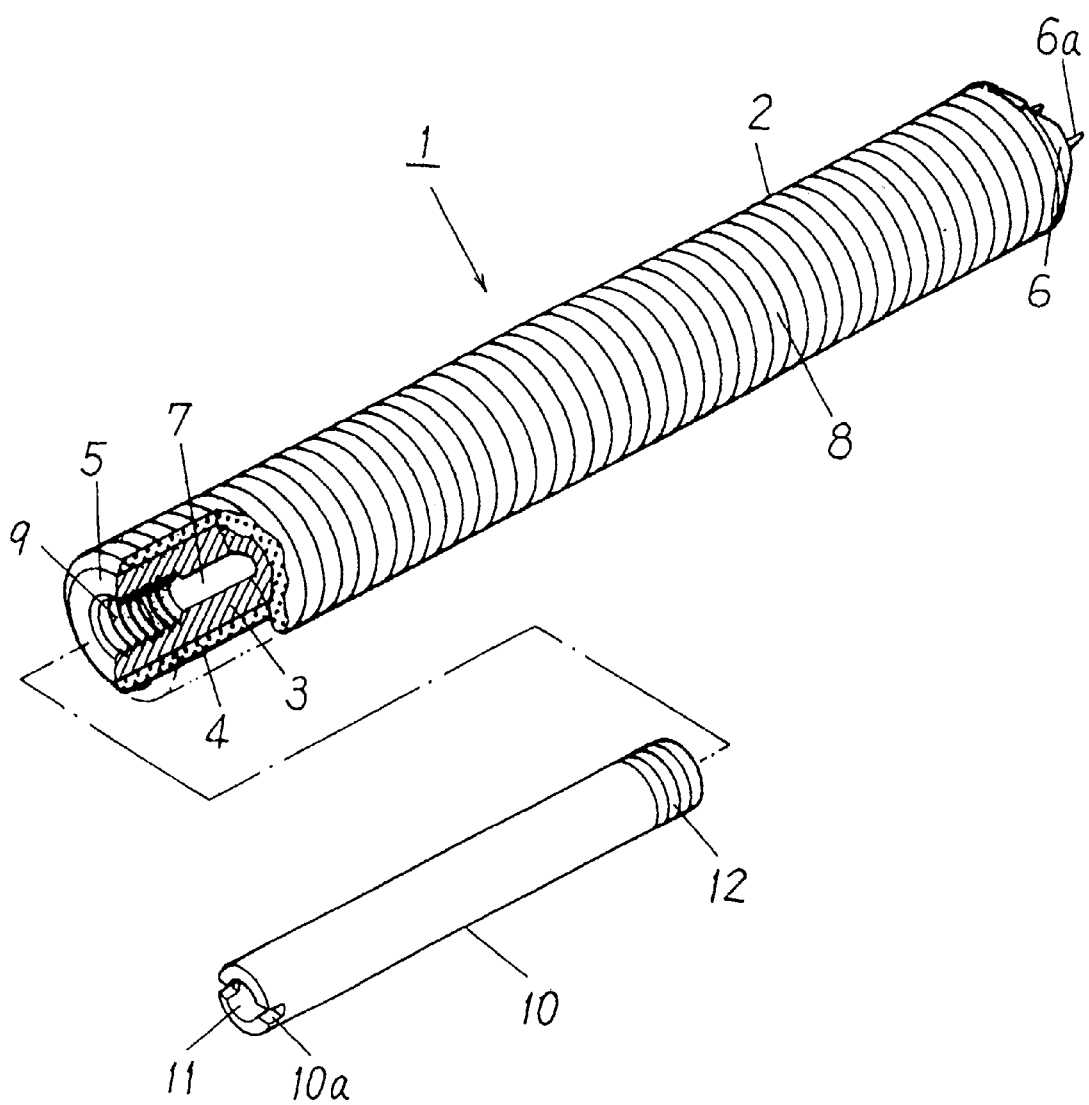
FIG. 1 is a perspective view partially cutaway of the connector of the first embodiment of this invention.

The embodiment of this invention is explained below while referring to the drawings.

Embodiment 1

FIG. 1 is a perspective view partially cutaway of the connector of the first embodiment of this invention. FIG. 2-*a* is a side view of that connector, and FIG. 2-*b* is a perspective view of an essential part of the adhesive agent outflow end side. FIG. 3 is a front view of an essential part of the end side showing a practical example of the cross sectional shapes of the tubular member of the connector.

The connector 1 in the first embodiment of this invention, comprises a tubular member 2 of double layer construction, a metal core member 3 having a hollow rod shape, a hollow plastic outer layer member 4 with concave or convex parts on the surface, a branch pipe engage part 5 formed in the hollow portion of the core member 3 of tubular member 2, an adhesive agent outflow end side 6 of tubular member 2 formed in an expanded shape in the metal core member 3, protrusions 6a in two pieces formed in symmetrical positions in the tip of adhesive agent outflow end side 6, a hollow part 7 for adhesive agent injection is open at both ends and formed longitudinally along the center of core member 3, a concave or convex part 8 screwably formed in the hollow plastic outer layer member 4 of the surface of tubular member 2, a tubular member side engage part 9 screwably formed in hollow part 7 of branch pipe engage part 5 of the tubular member 2, a plastic branch pipe 10 screwably engaging with branch engage end part 5 of tubular member 2, a screwdriver groove 10a formed in the end of branch pipe 10, a branch pipe hollow part 11 connecting with the hollow part 7 of core member 3 in tubular member 2, an engage part 12 screwing into the end of tubular member engaging side section 9, and an adhesive agent guide groove 13 formed in a concave shape on the expanded-shaped surface of adhesive agent outflow end side 6.

While the outer layer member 4 is made of plastic, it may also be made of wood and the like for obtaining a specified diameter.

In FIG. 3-*a* the cross section of the tubular member 2 is formed in generally a circular shape for easy insertion into rough cut connecting holes made in the wood, etc.

In FIG. 3-*b* the cross section of the tubular member 2 is formed generally in an elliptical shape for joining mudsills and pillars, dispersing external force, reinforcement and also to prevent rotation of the member. This shape also gives greater strength against bending yield stresses, especially along the major axis of the cross section.

In FIGS. 3-*c* through 3-*e* the cross sections of the tubular member 2 are respectively formed in rectangular, hexagonal or triangular shapes as needed to prevent rotation between the members. The protrusion 6a is not formed on the adhesive outflow end side 6 since the tubular members in FIGS. 3-*b* through 3-*e* cannot rotate.

In reference to the connectors of the first embodiment constituted as described above, the connection methods for those structural members, and the connecting structure between the structural members are described as follows.

WORKING EXAMPLE 1

Figure 4:
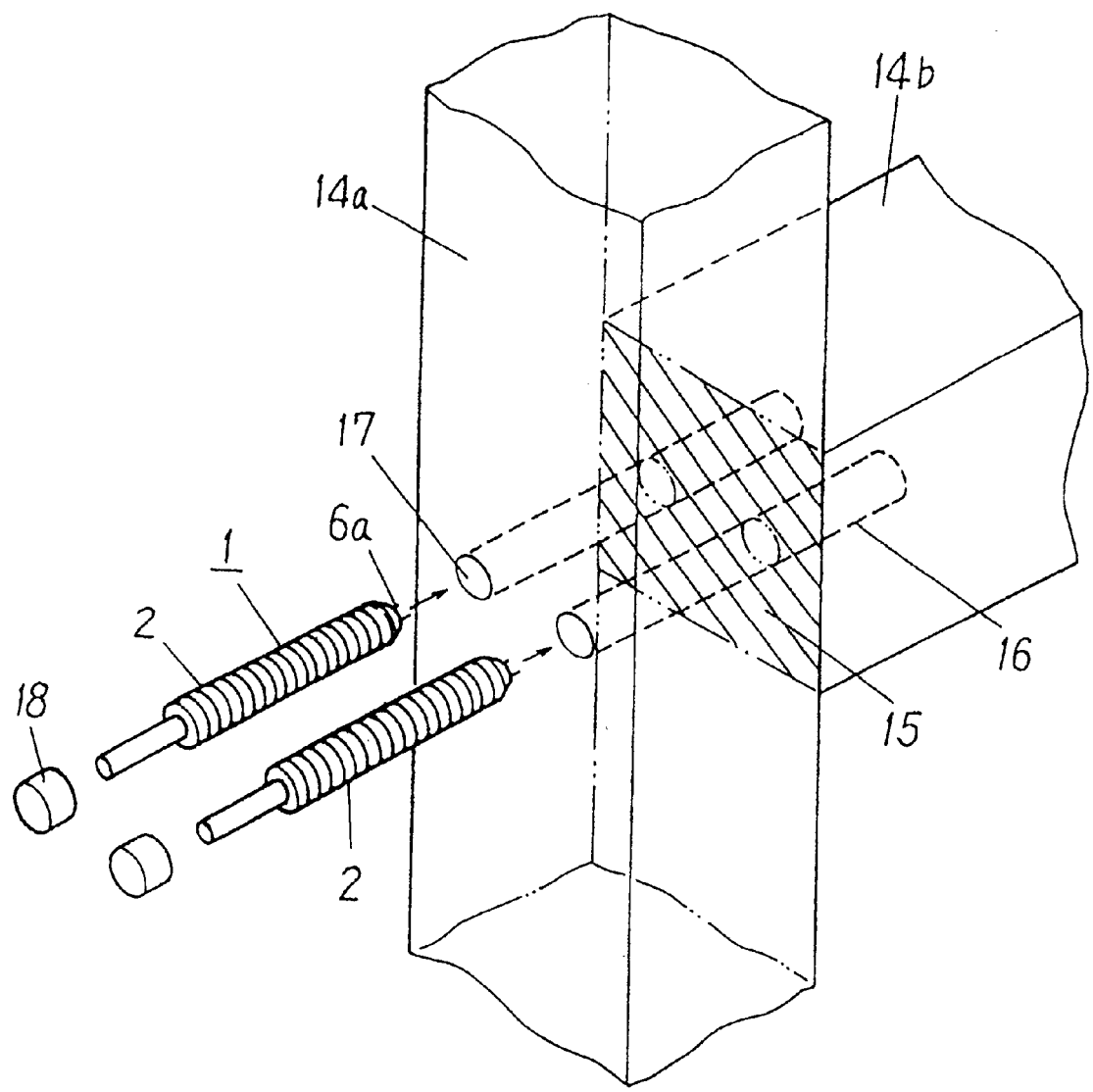
FIG. 4 is a perspective view during installation of the joint for independent columns and girt using the connector of the first embodiment of this invention.

FIG. 4 is a perspective view at the installation of the joint for independent columns and girt used in the connector of the first embodiment of this invention. FIG. 5-*a* is a cross sectional view of the connecting hole center showing the setup during installation of the joint. FIG. 5-*b* is a cross sectional view of the connecting hole center showing the setup after installation of the joint.

Here, the numeral 15 indicates a joint surface between the independent column 14a and the girt 14b. A connecting hole 16 is formed through the joint surface 15 to mate the independent column 14a with the girt 14b.

An opening 17 is at the opening of the connecting hole 16. Once the joint is connected, a plug 18 made of wood or plastic etc. is used to cover the opening 17 and to fit flush with the surface of the column. An adhesive agent pouring gun 19 injects the adhesive agent 20 which flows from the branch pipe 10, passes along the hollow part 7 of the tubular member 2 and an adhesive agent guide groove 13 while filling the connecting hole 16, until observed coming out from the opening 17 of the connecting hole 16.

First the connecting hole 16 is precut or drilled through the connected surface between the independent column 14a and the girt 14b in such a depth that the middle portion of the connector 1 is crossed by the joint surface 15, with a diameter slightly greater than the diameter of the connector. The connector 1 is inserted into connecting hole 16 and the protrusion 6a is driven to the bottom of connecting hole 16. The adhesive agent gun 19 is mounted at the opening of branch pipe 10. Then, the adhesive agent 20, flows along the hollow part of connector 1 and continues filling connecting hole 16, until observed coming out from opening 17 of connecting hole 16. As shown in FIG. 5-*a*, the adhesive agent 20 is fed from the branch pipe hollow part 11 as indicated by the arrow, through hollow part 7 and fills the gap between the surface of the tubular member 2 and the circumferential wall of the connecting hole 16. The adhesive agent 20 is injected in with almost no leaks and no channeling or short paths because of the buffer effect by concave-convex surface 8 on tubular member 2.

Continued injection of the adhesive agent 20 by continuous feeding can be observed to fill the gap between the outer surface of branch pipe 10 and connecting hole 16 so that uneven filling is prevented.

Thus in this present embodiment, besides obtaining a specific strength with a metal core member, jigs with different diameters can be easily made by fitting over a synthetic outer layer member formed in a metal mold. Forming of the wooden joint is an extremely simple operation performed with connecting holes by drilling and the like and a connecting structure that provides superior mechanical strength is obtained.

Embodiment 2

Figure 6:
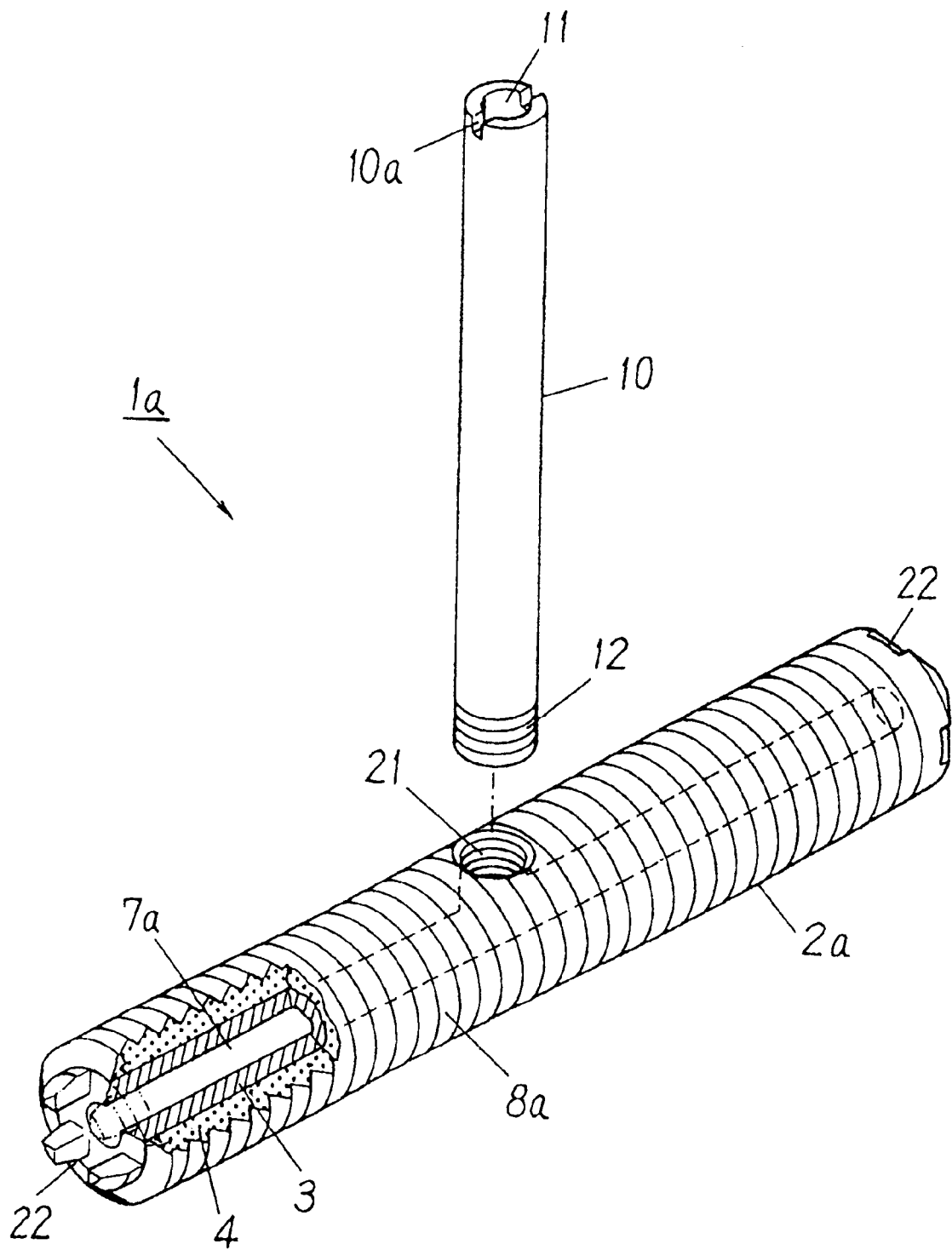
FIG. 6 is a partial cutaway perspective view of the connector of the second embodiment of this invention.

FIG. 6 is a partial cutaway perspective view of the connector of the second embodiment of this invention. Branch pipe 10, screwdriver groove 10a, branch pipe hollow portion 11 and engaging portion 12 are like those in the first embodiment so identical numbers are assigned to the same and the description is omitted.

Here, the connector 1a of the second embodiment of this invention has a tubular member 2a of double-layer construction consisting of a hollow-shaped metallic outer layer member 4a formed in corrugated sections on the surface of the plastic, hollow rod-shaped core member 3a. The hollow part 7a is for adhesive agent insertion in the openings longitudinally formed at both ends of the center section of the core member 3a, corrugated section 8a is formed on the surface of outer layer member 4a of tubular member 2a. A branch pipe hole 21 is formed with screw threads connecting to hollow part 7a in the longitudinal midpoint of tubular member 2a. An adhesive agent guide groove 22 is formed in a concave shape at the end of core member 3a.

WORKING EXAMPLE 2

Figure 7:
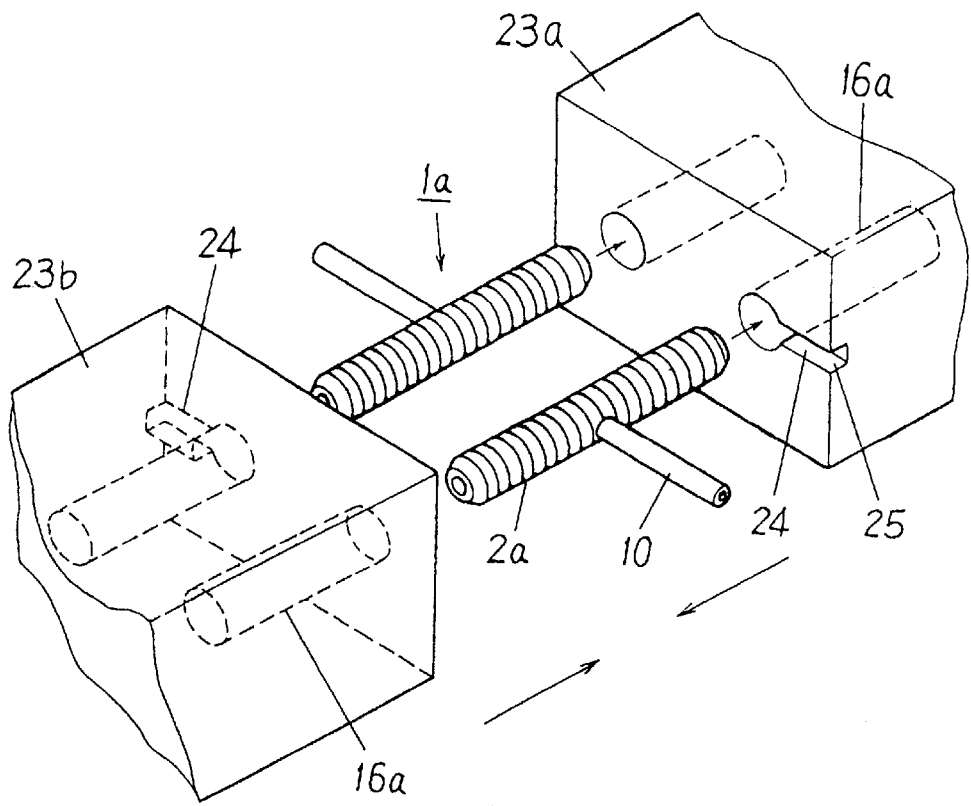
FIG. 7 is a perspective view during thrust installation for joining beams and poles using the connector of the second embodiment of this invention.
Figure 8:
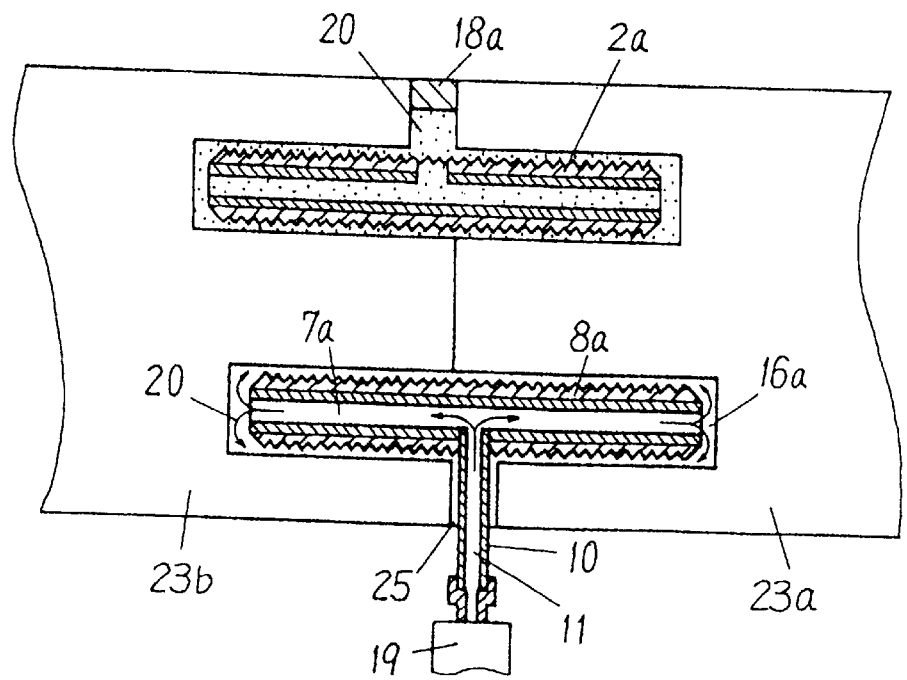
FIG. 8 is a cross sectional view of an essential part of the center connection showing the setup during thrust installation for joining beams and poles using the connector of the second embodiment of this invention.

FIG. 7 is a perspective view during thrust installation for joining beams or joists using the connector of the second embodiment of this invention. FIG. 8 is a cross sectional view of an essential part of the center of connection part showing the setup during installation.

The reference numeral 16a denotes a connecting hole formed in the abutting surface. The beam pieces 23a, and 23b are used for making the thrust joint. The branch pipe mount groove 24 is cut out for mounting of the branch pipe 10 in the adjoining surface of the connecting hole 16a with an opening 25 provided for the branch pipe mount groove 24. After making the thrust joint, the opening 25 of the branch pipe mount groove 24 is covered and a wood or plastic plug 18a is driven to be flush with the surface of the beam piece. Numeral 19 denotes adhesive agent pouring gun. The adhesive agent 20 injected from the branch pipe 10, flows along the hollow part 7a of the tubular member 2a while filling the connecting hole 16a, until observed coming out from the opening 25 of the branch pipe mount groove 24.

In the installation of this embodiment, first, the connecting hole 16a connecting the beam pieces 23a and 23b, is precut or drilled for carrying out the thrust joint at such a depth that the midpoint of the connector 1a is crossed by the connecting surface with a diameter slightly greater than the diameter of the connector that connects the adjoining surfaces of the beam pieces 23a and 23b. The branch pipe mount groove 24 is formed for mounting the branch pipe 10 in the one adjoining surface of the connecting hole 16a. Next, in the adjacent surfaces connected by the connecting hole 16a, the tubular member 2a engaged with the branch pipe 10 is inserted, and a support jig is used to temporarily fix the beam pieces 23 and 24 in place with winged bolts.

The adhesive agent pouring gun 19 is mounted at the opening of branch pipe 10. Then, the adhesive agent 20, flows along the hollow part of connector 1a and continues filling connecting hole 16a, until observed coming out from opening 25 of branch pipe mount groove 24. As shown in FIG. 8, the adhesive agent 20 is injected from the branch pipe hollow part 11 as indicated by the arrow, through the hollow part 7a and fills the gap between the surface of the tubular member 2a and the walls of the connecting hole 16a in the same manner as embodiment 1.

Thus in this present embodiment, a specific strength and diameter is obtained with a metal outer layer, and a hollow part for filling with adhesive agent can be formed with a plastic pipe of center material. Therefore even if a larger jig diameter is needed, its wall thickness can be made relatively thin to reduce the weight.

Embodiment 3

Figure 9:
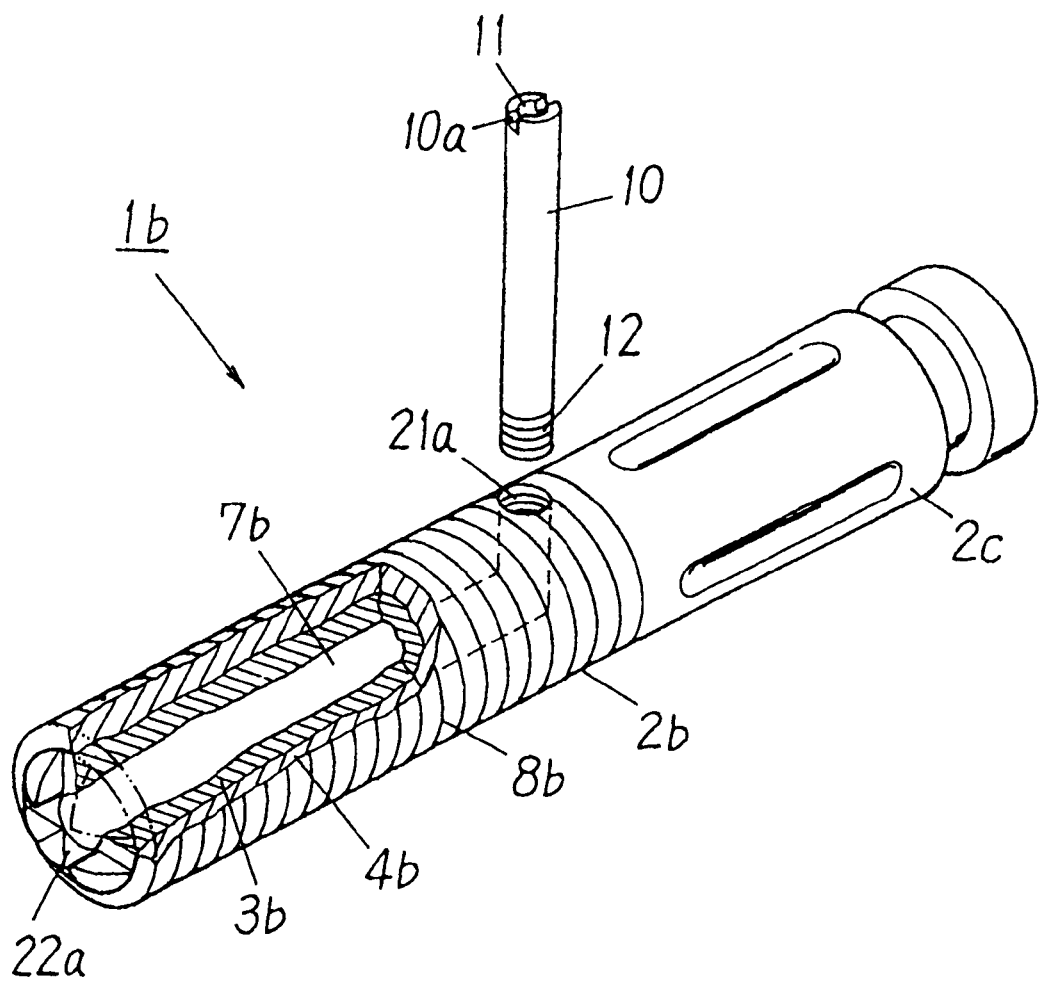
FIG. 9 is a partial cutaway perspective view of the connector of the third embodiment of this invention.

FIG. 9 is a partial cutaway perspective view of the connector of the third embodiment of this invention.

Branch pipe 10, screwdriver groove 10a, branch pipe hollow part 11 and engage part 12 are the same as in the first embodiment so identical numbers are assigned and the description omitted.

Here, the connector 1b of the third embodiment of this invention has a tubular member 2b of laminated double-layer construction, with a metallic outer layer member 4b formed in corrugated portions on the surface of the plastic, hollow rod-shaped core member 3b closed at one end, and concave or convex shaped buried part 2c closed at one end and used for installation in concrete. The hollow part 7b closed at one end is for adhesive agent insertion in the longitudinal direction of the center section formed in core member 3b, concave or convex part 8b is formed on the surface of the outer layer member 4b of the tubular member 2b, branch pipe hole 21a is formed with screw threads connecting to the hollow part 7b in the specified section longitudinally of tubular member 2b. Adhesive agent guide groove 22a is formed in a concave shape at one end of core member 3b.

Connection methods for structural members using connectors in the third embodiment of this invention are described next.

WORKING EXAMPLE 3

Figure 10:
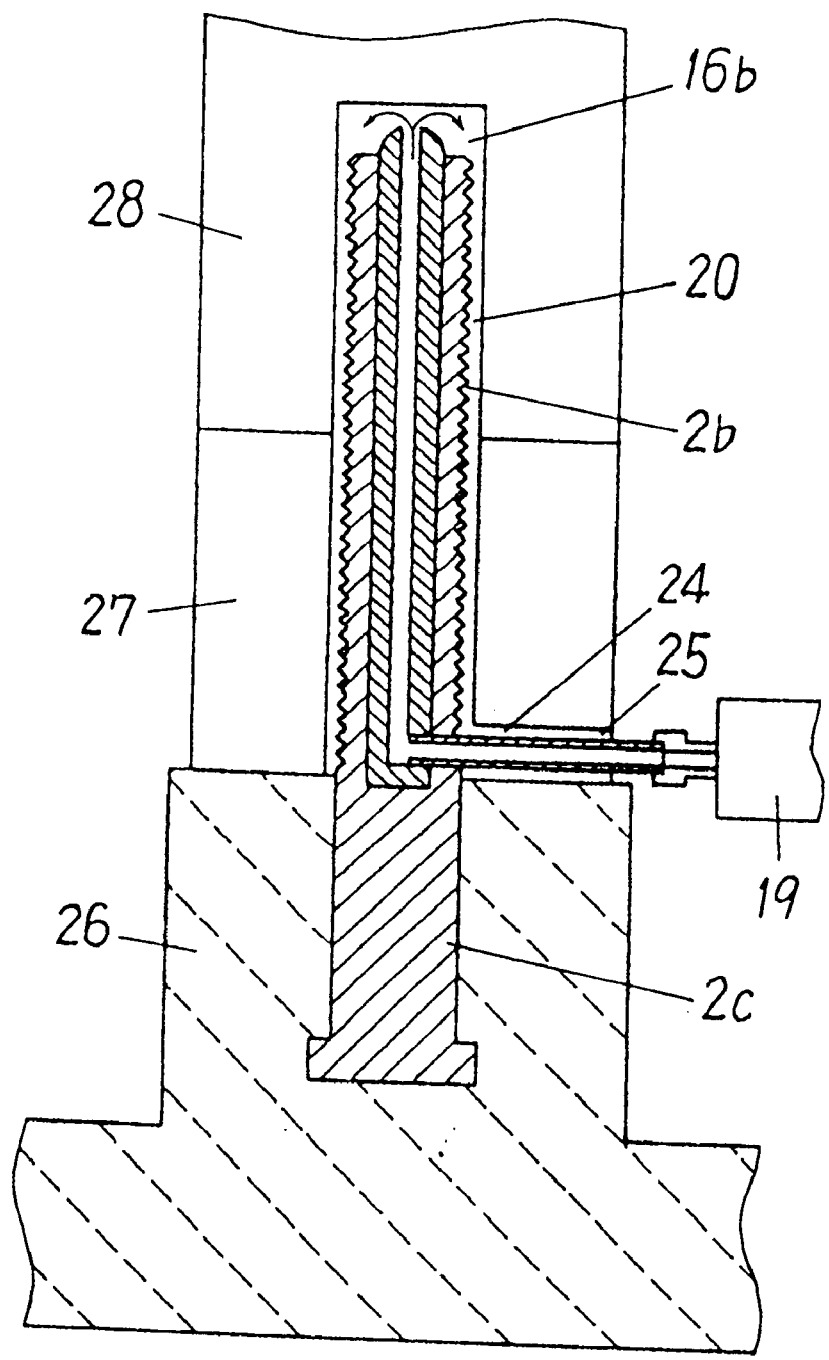
FIG. 10 is a cross sectional view of an essential part of the connection hole center during installation of the connector used in pillars, mudsills and concrete foundations in the third embodiment of this invention.

FIG. 10 is a cross sectional view of an essential part of the connecting hole center during installation of the connector used in pillars, mudsills and concrete foundations in the third embodiment of this invention. Branch pipe mount groove 24 is formed in the adjoining surface of mudsill 27, opening 25 is used for branch pipe mount groove 24, mudsill 27 is connected to concrete foundation 26, and pillar 28 is connected to mudsill 27.

First, concrete buried part 2c of connector 1b is buried in concrete when concrete foundation 26 is poured. Next, a connecting hole 16b is drilled in the adjoining surfaces of mudsill 27 and pillar 28 to a diameter slightly larger than the diameter of connector 2b and to a depth such that the remainder fits in the mudsill 27 and the pillar 28. The branch pipe mount groove 24 is formed in the adjoining surface of the mudsill 27.

Next the tubular member 2b of the connector 1b mounted with the branch pipe 10 is inserted in the connecting hole 16b of the mudsill 27 and the concrete foundation 26, the mudsill 27 and the pillar 28 are all placed to adjoin each other. The adhesive agent 20 is injected from the adhesive agent pouring gun 19 in the direction of the arrow, until the adhesive agent 20 is observed flowing backwards out of the opening 25 of the branch pipe mount groove 24. The adhesive agent pouring gun 19 is then removed from the opening 25 and a plug is inserted to the opening 25 (not in drawing) and installation is complete.

This embodiment clearly demonstrates that materials such as wood, and concrete or stone can be easily connected by using a connector having an anchor section.

Embodiment 4

Figure 11:
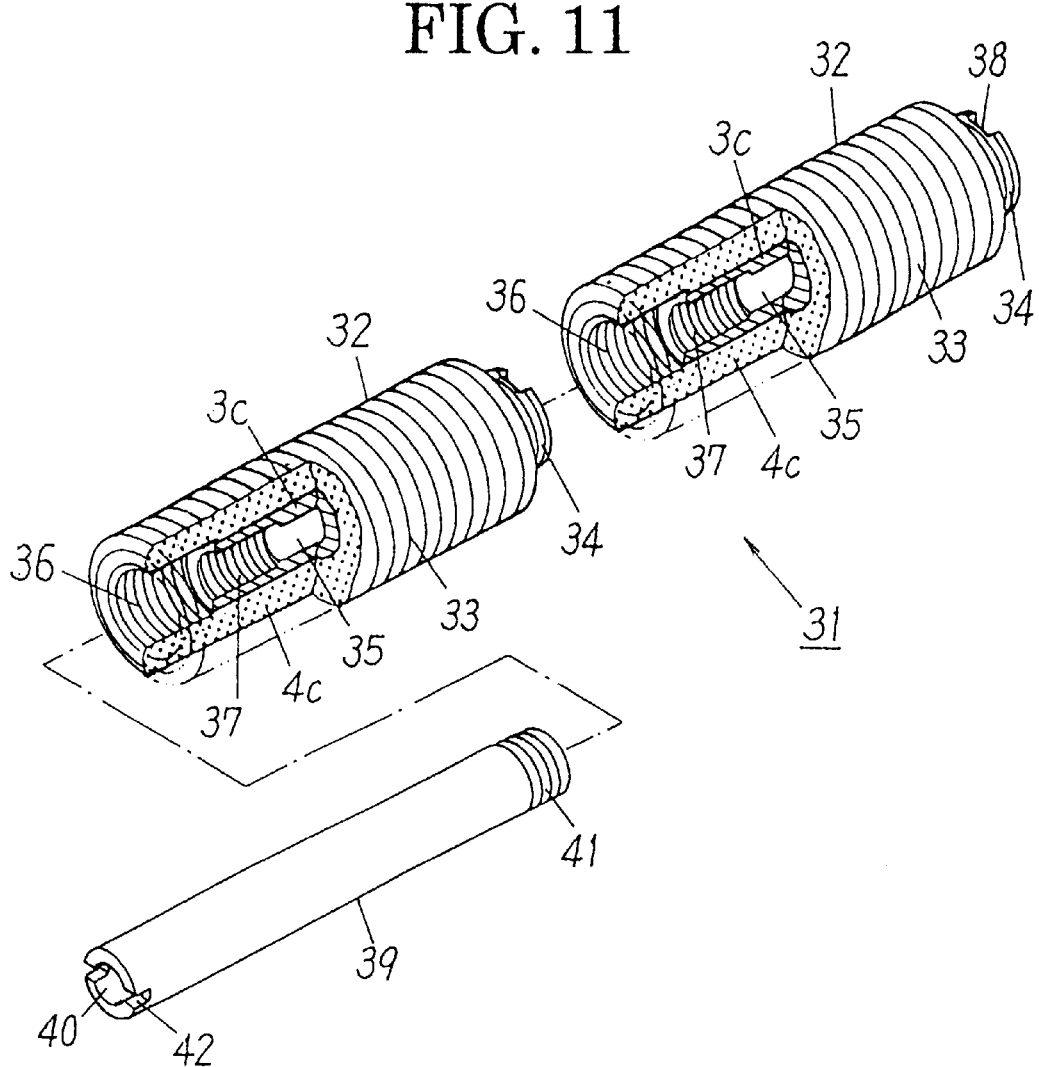
FIG. 11 is a partial cutaway perspective view prior to connecting together of the connector units of the fourth embodiment of this invention.
Figure 12:
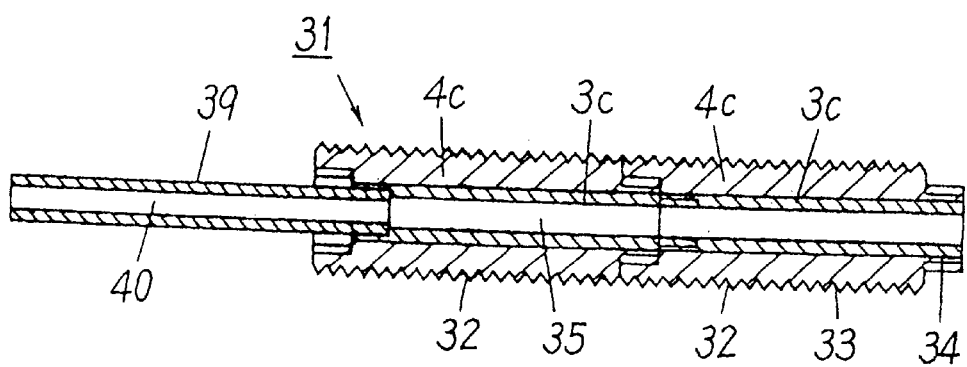
FIG. 12 is a cross sectional view of an essential part of the connected connectors showing the setup of the connected connector units of the fourth embodiment of this invention.

FIG. 11 is a partial cutaway perspective view before to connecting together the connector units of the fourth embodiment of this invention. FIG. 12 is a cross sectional view showing an essential part of the setup of the connected connector units of the fourth embodiment of this invention.

The metal connected connector 31 is made up of two connector units by slidable attachment with a hollow part. Connector unit 32 is a double-layer structure with a plastic pipe-shaped core member 3c inserted in the metal hollow rod-shaped outer layer member 4c. The concave or convex part 33 is formed around the surface of side portion against outer layer member 4c of the connector unit 32. The convex-shaped unit engage part 34 at one end of connector unit 32 screws into the connected unit engage part of another connector unit 32. The hollow part 35 has openings on both ends and is formed in the center longitudinal direction of the core member 3c of the connector unit 32 for filling with adhesive agent. The concave-shaped unit engage part 36 screws over the convex-shaped unit engage part 34 with other connector units 32. The engage part 37 is formed spirally and coaxially with the unit engage part 36 at the end of the connector unit 32 in the step-shaped hollow part 35. The adhesive agent guide groove 38 is formed in a concave shape in the unit engage part 34 of connector unit 32. The metal branch pipe 39 screwably engages the branch pipe engage part 37 of connector unit 32. The branch pipe hollow part 40 formed in branch pipe 39, is to align with the connector unit hollow part 35. The engage part 41 for the branch pipe is screwed into the engage part 37 of connector unit 32 which is formed to screw into the end of the branch pipe. The screwdriver engaging groove 42 engages the screwdriver when the connector unit 32 and branch pipe 39 engaged or disengaged.

The unit engage part 36 and branch pipe engage part 37 can be machined in a truncated cone shape instead of being machined in steps. This enables free selection of different diameters for branch pipe 39 according to the type of installation site and adhesive agent. The outer layer member 4c is made of metal, and the core member 3c of plastic but an opposite arrangement of a metal hollow pipe for core member 3c and plastic or wood material for the outer layer member 4c is also acceptable.

This embodiment differs from embodiment 1 in two points: the end portion of the tubular member comprising two layers of metal and plastic is provided with the unit engage part for connecting the hollow parts by detachably connecting to the other connector unit so that a required length of connected connector can be made at the work site according to the lengths of the structural members to be mated; the engage part for the branch pipe is formed inside the unit engage part so that the branch pipe for injecting adhesive agent can be engaged. The connecting method for the structural members is the same as working example 1, so a description is omitted here.

Thus according to this embodiment, along with obtaining a metal outer layer member of specified strength and diameter, a hollow section for injection of adhesive agent can be formed with the plastic pipe of core member so that even if the jig diameter is increased, there is no need to enlarge the outer layer member and a lighter weight is achieved. A further advantage is that one or a plurality of connectors having both light weight and sufficient strength can be easily connected at the work site to form a connector unit according to the size and shape needed.

Embodiment 5

Figure 13:
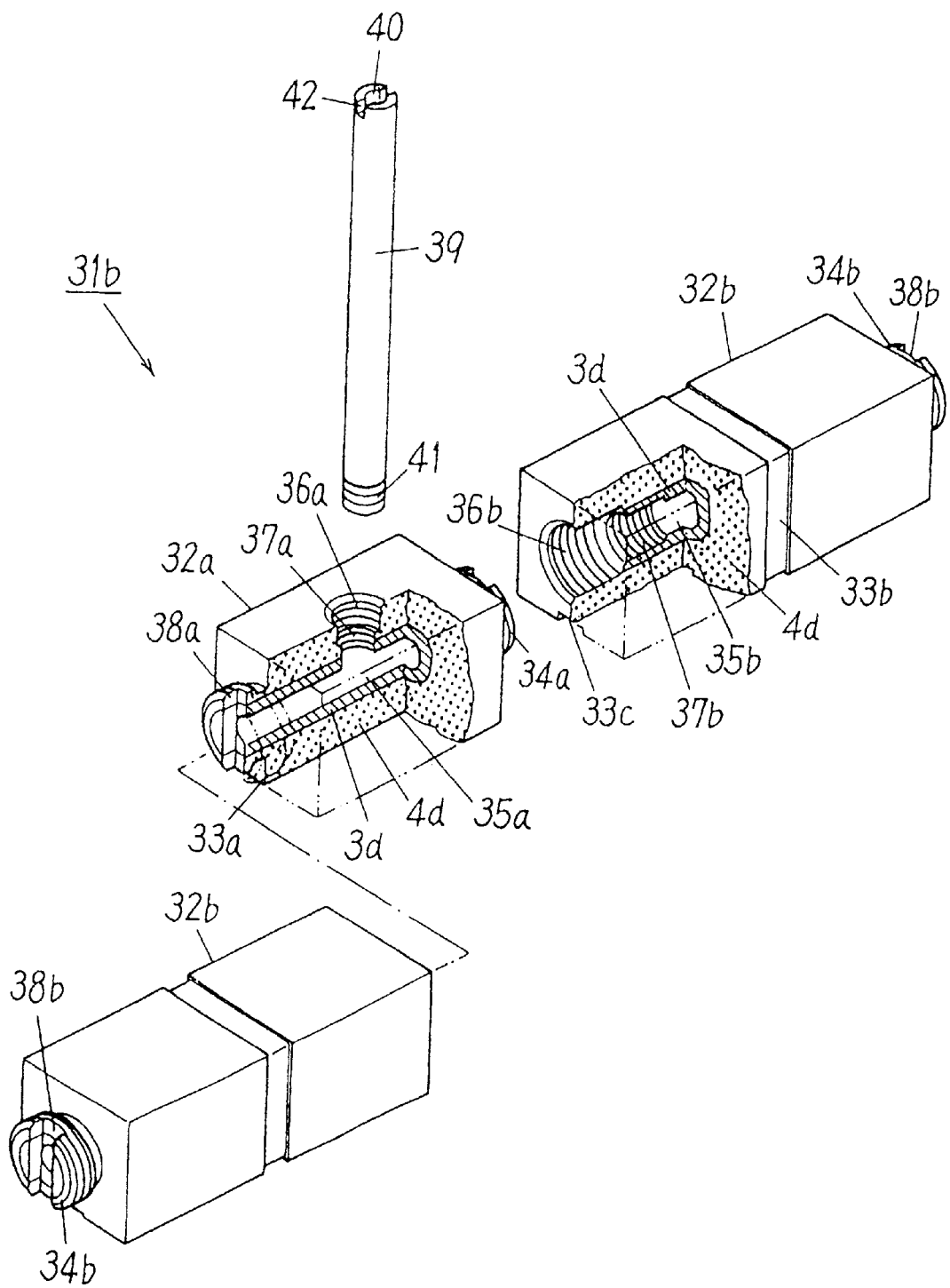
FIG. 13 is a partial cutaway perspective view of the connector units of the fifth embodiment of this invention.
Figure 14:
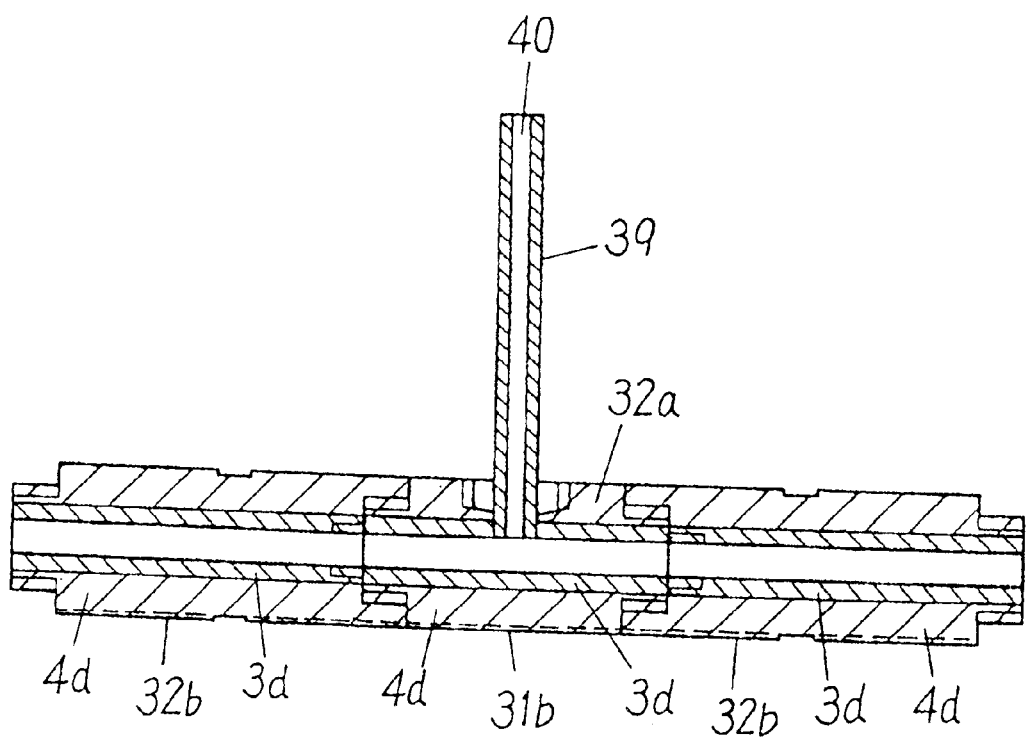
FIG. 14 is a cross sectional view of the connected connector units of the fifth embodiment of this invention.

FIG. 13 is a partial cutaway perspective view of the connector units of the fifth embodiment of this invention, and FIG. 14 is a cross sectional view of the connected connector units of the fifth embodiment of this invention.

The connected connector 31b has one connector unit 32b on each end of connector unit 32a. The connector unit 32a has a unit engage part at both ends connecting other connector units and a branch pipe engage part at a specified position longitudinally and is made up of a metal outer layer member 4d and a hollow part made of core member 3d. Concave portion 33a is a concave portion on the rear side of connector unit 32a. A convex shaped unit engage part 34a screwably engages with a connected unit engage part formed at an end of another connector unit screwably connecting to the hollow part of connector unit 32a, hollow part 35a for filling with adhesive agent is open at both ends and formed in a T shape in the center portion in the longitudinal direction of connector unit 32a. The concave-shaped unit engage part 36a screwably engages with other connector units and is drilled to connect to the hollow part 35a in the specified section longitudinally of connector unit 32a. The branch pipe engage part 37a is screwably formed adjacent to unit engage part 36a. An adhesive agent guide groove 38a is formed in a concave shape in the unit engage part 34a of connector unit 32a.

A connector unit 32b has a hollow angular rod shape made of plastic core member 3d and a metal outer layer member 4d. A bottom 33b of the concave part is formed on the surface of connector unit 32b. A concave part 33c of the concave or convex part is formed on the underside of the connector unit 32b. The unit engage part 36b screwably formed at one end of the hollow part of connector unit 32b, screwably engages with unit engage part 34a of other connected connector units 32a. A branch pipe engage part 37b is screwably formed in the hollow part at one end of unit engage part 32b. An adhesive agent guide groove 38b is formed in a concave shape in the unit engage convex-shaped part 34b of connector unit 32b.

When the mating units 32a and 32b only engage with a connector unit, machining of branch pipe engage parts 37a and 37b is not necessary.

This embodiment differs from embodiment 2 in that a unit engage part is provided connecting the hollow part and connecting for slidable attachment/detachment with other connector units at the center in the longitudinal direction or end of the tubular member composed of a double-layer structure of metal and plastic, and differing in that connected connectors can be made at the work site and connected together in the lengths needed according to the structural members to be joined and also in that the tubular member has an angular rod shape.

The connecting method for the structural members, except for the drilling of the holes in a rectangular part shape, is basically the same as embodiment 2, so a description is omitted here.

Thus according to this embodiment, along with obtaining a metal outer layer member of specified strength and diameter, there is no need to increase the thickness of the outer layer member of metal more than the strength necessary, because even if the shape is enlarged, a hollow portion for injection of adhesive agent can be formed with the plastic pipe of core member, and a lighter weight is achieved. A further advantage is that one or a plurality of connectors having both light weight and sufficient strength can be easily connected at the work site to form an angular rod-shaped connector unit according to the size and shape required.

Embodiment 6

FIG. 15-a is a partial cutaway perspective view prior to connecting the connector units together in the sixth embodiment of this invention, and FIG. 15-b is a cross sectional view showing the connector connected from the connector units of the sixth embodiment of this invention.

The connector 32 of double-layer construction with plastic pipe core member 3c inserted in the hollow rod-shaped metal outer layer member 4c and, the concave or convex part 33. Unit engage parts 34 and 36, the hollow part 35, the adhesive agent guide groove 38, the branch pipe 39, the branch pipe hollow part 40, the engage part 41 and the screwdriver engaging groove 42 are the same as in the fourth embodiment so identical numbers are assigned to the like components and the description omitted.

The connector unit 32c is closed at one end of the hollow part with a concave or convex shaped anchor on the surface of the closed end and, in the same way the double-layer structure of metal outer layer member 4e and plastic core member 3e are the same as the connector unit 32 with a unit engage part connecting at a specified section longitudinally at the other end. The connected connector 31d comprises the connector unit 32 of embodiment 4, to which the unit engage part of connector unit 32c is connected. A concave or convex part 33d is formed on the surface of connector unit 32c. A unit engage part 34c is detachably engaged to connect with the hollow parts of one end part of connector unit 32 to which the other end part of connector unit 32c is connected. A hollow part 35c to be filled with adhesive agent is open at one end and formed longitudinally in the center portion of connector unit 32c. A branch pipe engage part 37d is formed with threads reaching to the hollow part at a specified longitudinal point in mating unit 32c and to which a branch pipe 39 is detachably fit.

WORKING EXAMPLE 6

Figure 16:
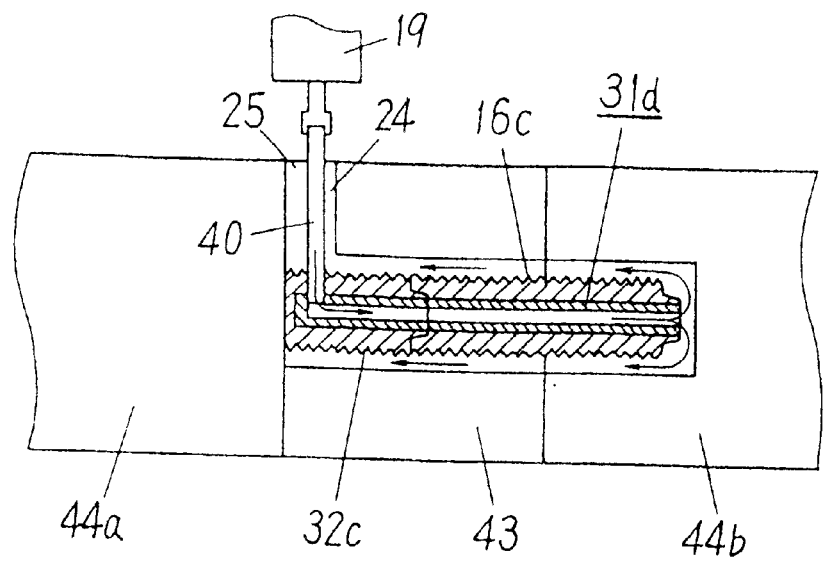
FIG. 16 is a cross sectional view of an essential part of the center of the connection showing the joint installation used in joining beams and poles using the connectors connected together as connector units of the sixth embodiment of this invention.

FIG. 16 is a cross sectional view of an essential part of the center of the connection showing the joint installation used in joining beams and beams using the connectors connected together as connector units of the sixth embodiment of this invention.

The connected connector 31d comprises the connector unit 32 of embodiment 4 to which connector unit 32c of the sixth embodiment is connected. Here 44a and 44b denote joint timbers adjoining a bracket timber 43. The connecting hole 16c is formed to connect with the adjoining surfaces of bracket timber 43 and joint timber 44b. A branch pipe mount groove 24 formed in the opening of connecting hole 16c on the end not adjoining bracket timber 43 receives branch pipe 39. The opening 25 is at the end of the branch pipe mount groove 24.

First, connecting hole 16c is drilled to a depth so that the center of connected connector 31d comes through the adjoining surfaces of bracket timber 43 and joint timber 44b, and to a diameter slightly larger than the diameter of connected connector 31d and connecting to the adjoining surfaces of bracket timber 43 and joint timber 44b for making the connecting joint. A branch pipe cutting portion 24 is formed at the opening of connecting hole 16c on the side not adjoining bracket timber 43. Next, the connector 31d is inserted in connecting hole 16c while engaged by branch pipe 39 and the bracket timber 43 and joint timber 44b made to adjoin each other. The adhesive agent injection method is the same as in working example 3 so an explanation is omitted here.

Thus, according to this embodiment a metal outer layer member of specified strength and diameter can be obtained in the same manner as embodiment 4. By forming a hollow portion for adhesive injection with the plastic core member, a light weight jig can be obtained and there will be no need to increase the outer metal layer thickness to more than the necessary strength even if the outer diameter is enlarged. Further, using the connected connector 31d of this embodiment, will prove effective when a connector cannot be inserted between the bracket timber 43 and joint timber 44b because of the sequence of the job installation, etc.

Embodiment 7

Figure 17:
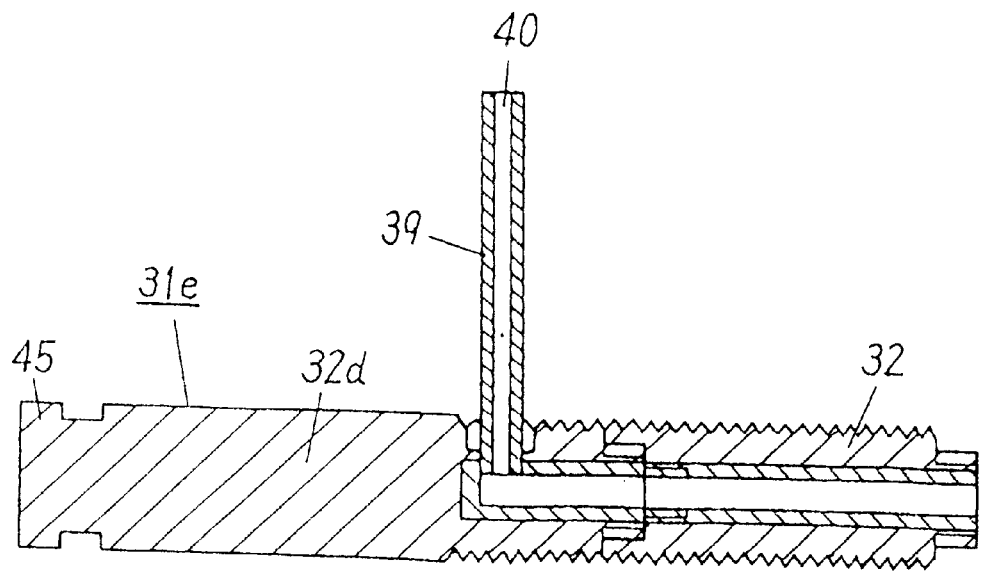
FIG. 17 is a cross sectional view of the connector showing an application of a connector unit of the sixth embodiment of this invention.

FIG. 17 is a cross sectional view of the connector showing an application of a connector unit of the sixth embodiment of this invention.

Here, connector unit 32 of the fourth embodiment, branch pipe 39, the branch pipe hollow part 40 are the same as in embodiment 6 so identical numbers are assigned and the description omitted.

The connector unit 31e is a modification of connector unit 32c of the sixth embodiment with an elongated closed portion and an anchor 45 mounted in the closed portion. The connected connector unit 31e is made by connecting connector unit 32 of embodiment 4 to connector unit 32d.

In the application here, the end of the connector unit of embodiment 6 not having an opening is elongated. However it may also be arranged that the closed end is provided with a unit engage section (not shown) to engage with other connector units having no hollow part, to which unit engagement section is connected a rod-shaped connector unit (not shown) having a unit engagement section for engaging with other connector units and an anchor section.

Points differing from embodiment 3 are that connector units can be connected at the work site according to the length of the structural members to be joined. These connector units are installed with unit engage parts connecting to the hollow part and attachably/detachably connected with other connector units set in the end of a tubular member made of a double layer consisting of a metal outer layer member 2 and plastic core member. The connected connector units can be made to the required length, and the tubular member length can be changed according to the thickness of the mudsill.

The connecting method for the structural members is basically the same as in embodiment 3, so a description is omitted here.

Therefore, according to this embodiment, by connecting connector units of a laminated structure composed of a double layer of plastic core member and metal outer layer, a light weight connector of ample strength can be easily made at the work site.

The invention claimed is:

1. A connector comprising,
a hollow elongate tubular member having a substantially uniform diameter said tubular member defining an interior passage said passage also having a substantially uniform diameter and comprising an opening on at least one end, said elongate tubular member having a laminated structure consisting of two or more materials and, an adhesive agent inlet communicating with said passage at a location distal from said opening, said opening further comprising a radial passage from said interior passage to the side wall of said tubular member, whereby adhesive introduced into said connector at said inlet can flow through said tubular member and then through said radial passage.

2. The connector of claim 1 further comprising a branch pipe and branch pipe engage means provided in said adhesive agent inlet, said branch pipe engage means allowing said branch pipe to freely attach and detach with said tubular member.

3. The connector of claim 2 in which said branch pipe is fixed in said branch pipe engage means.

4. The connector as recited in claim 2 wherein said branch pipe and said tubular member are in axial alignment.

5. The connector as recited in claim 2 wherein the area of an axial section of the branch pipe is smaller than the area of an axial section of the tubular member.

6. The connector as recited in claim 5 wherein the outer diameter of the branch pipe is smaller than the outer diameter of the tubular member.

7. The connector as recited in claim 2 wherein said branch pipe engage means are threads.

8. The connector of claim 1 wherein the exterior surface of said tubular member further comprises projections.

9. The connector as recited in claim 8 wherein said projections comprise a spiraled corrugated arrangement.

10. The connector of claim 1 wherein said laminated structure comprises a first layer made from a member of a group consisting of metal, plastic, ceramic and wood and a second layer made from a member of a group consisting of metal, plastic, ceramic and wood.

11. The connector as recited in claim 1 wherein said radial passage comprises a groove.

12. The connector as recited in claim 1 wherein an axial section of the tubular member is annular.

13. The connector as recited in claim 1 further comprising a plurality of projections extending in an axial direction from an end wall defining said opening.

* * * * *